July 29, 1952 I. A. GREENWOOD, JR., ET AL 2,605,335

LIGHT AMPLIFIER

Filed May 25, 1949

Inventor
IVAN A. GREENWOOD JR.
EVERETT B. HALES

By H. L. Mackey

Attorney

Patented July 29, 1952 2,605,335

UNITED STATES PATENT OFFICE 2,605,335

LIGHT AMPLIFIER

Ivan A. Greenwood, Jr., Pleasantville, and Everett B. Hales, Mount Kisco, N. Y., assignors to General Precision Laboratory Incorporated, a corporation of New York Application May 25, 1949, Serial No. 95,242

3 Claims. (Cl. 177—318)

This invention relates to a light amplifier having a wide range of utility and one which is particularly suitable for use in projection television systems wherein the received television image is projected on a relatively large screen.

In projection television systems in common use the received images are displayed on the face of a small cathode ray tube by means well known in the art and these images are in turn projected on a screen by means of any one of a number of projection systems. All of these systems merely enlarge the image formed on the cathode ray tube fluorescent screen to a size suitable for display on the viewing screen and hence the amount of light per unit of surface of the viewing screen is correspondingly decreased. This results in relatively poor illumination of the viewing screen as there is a limit to the amount of light which may be produced at the fluorescent screen of the cathode ray tube.

The instant invention has for its purpose the provision of a system wherein at the same time that the picture is being enlarged by suitable projection optics the amount of light derived from the cathode ray tube screen is also amplified thus yielding an enlarged image of a brightness heretofore unattainable.

In order that the light available for the viewing screen may be increased in the manner indicated the present invention proposes that the image on the cathode ray tube screen be formed on a sensitive photo-emissive surface either by intimate contact between the cathode ray tube phosphor and the photo-emissive surface or by the interposition of an optical system therebetween. A second fluorescent screen is enclosed in an evacuated envelope with the photo-emissive surface and a large accelerating field is applied between these elements so that a visible image of the photo emission is produced.

The photo-emissive surface and the second fluorescent screen may be positioned closely adjacent each other in which event if a large potential difference exists therebetween no focusing field is necessary.

Likewise the evacuated envelope containing the photo-emissive surface and fluorescent screen may be made of such a surface area that the fluorescent screen itself acts as the viewing screen, the equipment occupying no more space than present projection television systems but operating with a considerably greater luminous flux from a given area of the screen.

Alternatively the same light amplifier system may be used as an intermediate element, a second projection system being provided to project the light image formed on the light amplifier fluorescent screen on a suitable viewing screen.

In either arrangement, however, the light is amplified at the same time that the image is enlarged in area so that the final image as viewed by the beholder is more brilliant than has heretofore been attained in large screen television systems.

The exact nature of the invention will be more readily understood from the following detailed description taken together with the attached drawings in which.

Figure 1:
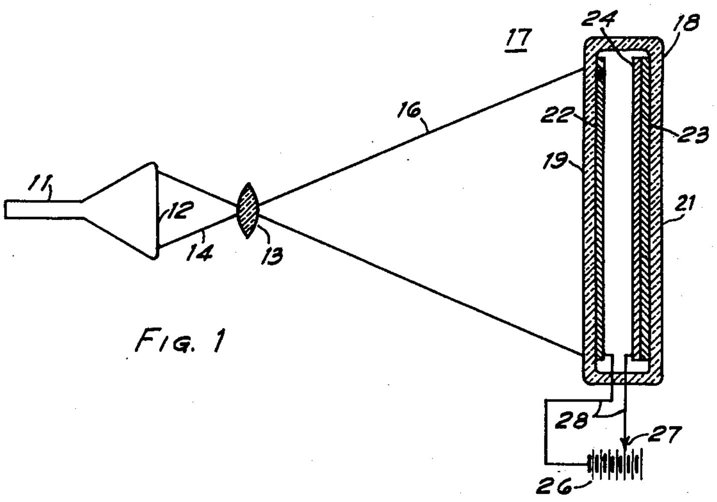
Fig. 1 is a diagrammatic illustration of the invention wherein the light amplifier also constitutes the view screen.

Referring now to Fig. 1 a television cathode ray tube 11 operated in the conventional manner displays the received images on the usual fluorescent screen 12. The screen 12 may be comparatively restricted in area as respects the area desired to be observed by the viewer. In order that appropriate enlargement of the image may be attained, the image displayed on the screen 12 is projected through an appropriate lens system indicated diagrammatically by the lens 13 and light rays 14 and 16 onto a novel combination of light amplifier and viewing screen indicated generally at 17.

The light amplifier and viewing screen 17 consists of an evacuated chamber 18 composed wholly or partially of glass having two faces 19 and 21 of relatively large area spaced from each other by a small amount so that the resultant unit formed thereby is of considerable height and width by relatively shallow depth forming a unit which may be readily fitted into the surface of a suitable cabinet containing a television receiver chassis.

The interior of the face 19 is coated with a thin layer 22 of photo-emissive material, the layer being of such a depth as to be semi-transparent. A real image of the display of the fluorescent screen 12 is projected on the photo-emissive layer 22 by the optical system 13 and thus electrons are emitted by the layer 22 the density of which in any elemental area of the layer 22 corresponds to the amount of light impinging thereon.

The opposed face 21 of the chamber 18 is coated with a layer of fluorescent material 23 on which a backing layer 24 of aluminum, silver or the like may be superimposed for purposes as will more fully appear hereinafter.

A large accelerating field indicated diagrammatically by the battery 26 provided with adjusting means 27 is connected between the photo-emissive surface 22 and the fluorescent screen 23 through the medium of conductors 28. This large accelerating field causes the electrons emitted by the photo-emissive surface 22 to pass through the backing layer 24 and impinge on the fluorescent layer 23 producing a visible light image thereon. Where the distance between the layers 22 and 23 is small, say in the order of a centimeter or less and a large accelerating potential is impressed therebetween, no focusing such as a magnetic field is necessary to cause the light image to agree in detail with the electron image producd by the layer 22 since in the short distance between the layer 22 and fluorescent screen 23 the electrons will travel in substantially straight lines.

The acceleration of the electrons emitted by the photo-emissive layer 22 results in an increased brightness of the image on the fluorescent screen 23 of the order of twenty times the brightness that would be attained if the image on the screen 12 were merely enlarged to the size of that depicted on the screen 23. Thus an enlargement of approximately 4.5 diameters may be attained which has the same brilliancy as the original image of reduced size.

Some further gain in light amplification may also be attained by the judicious use of light feedback between the photo-sensitive layer 22 and the fluorescent screen 23.

If the photo-sensitive layer 22 is affected by light of the wavelength given off by the fluorescent screen 23 a regenerative effect will be produced since the light from the screen 23 falling on the photo-sensitive layer 22 will increase the electron emission thereof which in turn will result in an increased illumination of the screen 23. This regenerative effect while useable to a controlled extent to increase the gain in light intensity must not be unlimited in its application as excessive amounts of such regeneration will reduce the contrast of the image depicted on the screen 23 or indeed may be carried to such an extent as to render the device uncontrollable.

In order, therefore, that the regenerative effect may be kept within proper limits, the fluorescent screen 23 is coated on its side adjacent to the photo-sensitive surface 22 with a thin semi-transparent layer 24 of aluminum or other metallic material. Thus a fraction only of the light of the screen 23 is transmitted back to the photo-sensitive surface 22 and the amount of the light so reflected back may be controlled by choosing a proper thickness for the layer 24 so that only the desired amount of regeneration is obtained.

On the other hand, a phosphor may be chosen for the screen 12 which produces an image mainly in the ultraviolet region and the photo-sensitive surface 22 may be made of such material as to be substantially unaffected by light of longer wavelengths than ultraviolet. Thus when a screen 23 is used having a phosphor which produces an image mainly of light in the visible regions little if any regeneration effect will take place because the photo-sensitive layer 22 is unaffected by such light.

Figure 2:
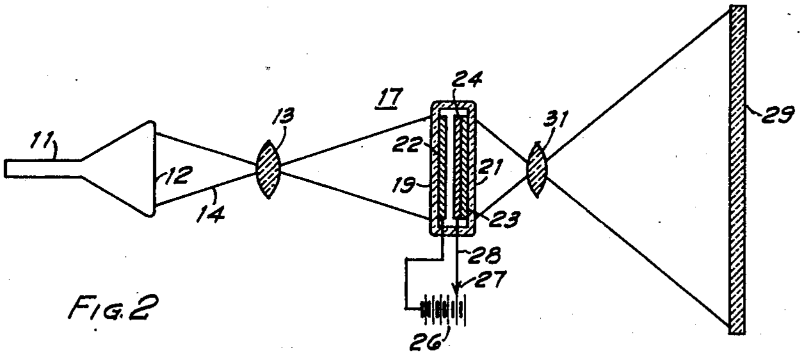
Fig. 2 is a diagrammatic illustration of a modified form of the invention wherein the light after being amplified in the novel manner here proposed is projected on a viewing screen of greater area than the light amplifier screen.

In some instances it may be desirable to provide a viewing screen which is separate and distinct from the light amplifying device permitting an amplifier of small physical dimensions. Such an arrangement is disclosed in Fig. 2 in which elements similar to those of the system of Fig. 1 have been accorded similar reference numerals. Referring to Fig. 2 a television cathode ray tube 11 having a fluorescent screen emits a light image either in the visible or ultraviolet range as discussed above and this image is projected on a photo-sensitive surface 22 deposited on one interior face 19 of a light amplifier 17. The light amplifier 17 is similar in all respects to that disclosed and described in connection with Fig. 1 save only in the matter of size, the height and width being smaller than that of the similar amplifier of Fig. 1 since in this instance the fluorescent screen 23 of the light amplifier 17 is not also used as the viewing screen.

The function of light amplification, however, is performed in the same manner by the use of similar structure and hence a detailed discussion need not be repeated. Suffice it to say that a light image is formed on the fluorescent screen 23 whose luminous flux for an equivalent area is considerably greater than that of the screen 12 of the cathode ray tube 11.

The light image of increased brightness produced on the screen 23 may then be projected on any suitable viewing screen 29 through the medium of a suitable optical system indicated diagrammatically by the lens 31. The screen 29 may be translucent so that the image projected thereon may be viewed from the side opposite to the light amplifier 17 and cathode ray tube 11 or alternatively a screen of high light reflecting properties may be utilized permitting the image to be viewed from the same side on which the cathode ray tube 11 and light amplifier 17 are placed as in the usual projection of slide and motion pictures.

When the image formed on the fluorescent screen of the light amplifier is projected on another screen for enlarged viewing purposes, the light amplifier may be made a part of the cathode ray receiving tube itself obviating the necessity of the interposition of an optical system between the cathode ray tube and the light amplifier. Such a system is depicted in Fig. 3.

Figure 3:
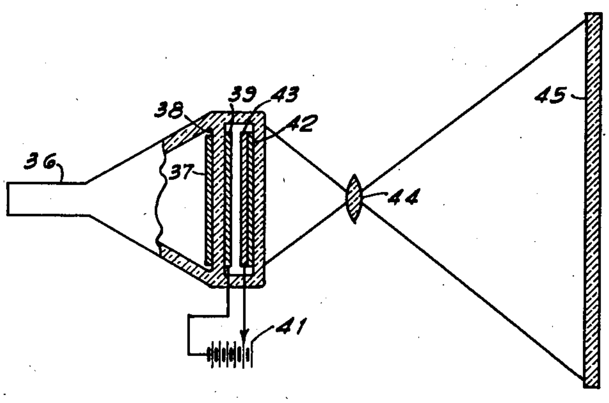
Fig. 3 is a diagrammatic illustration of a further embodiment of the invention in which the photo-emission surface of the light amplifier is positioned closely adjacent the fluorescent screen of the cathode ray tube.

Turning now to Fig. 3 a cathode ray tube 36 having the usual electron gun assembly and deflecting means (not shown) is provided adjacent its larger end with a fluorescent screen 37 which is formed by coating one surface of a thin transparent member 38 with a layer of suitable fluorescent material. The member 38 is mounted in the enlarged end of the cathode ray tube 36 in any suitable manner and its face opposite that provided with the fluorescent layer is coated with a layer of photo-sensitive material as indicated at 39. Thus the photo-sensitive surface is closely juxtaposed to the fluorescent screen 37 and the light image formed on the screen 37 produces an emission of electrons by the photo-sensitive surface 39, the amount of which is proportional in any elemental area to the light intensity of the corresponding area on the screen 37.

This electron image is accelerated by a high potential supplied by the source 41 towards a second fluorescent surface 42 which may be backed by an aluminum or other metallic layer 43 for the purposes as set forth above.

In the same manner as previously described the electron image so accelerated produces a light image on the screen 42 which is considerably increased in brilliance over that originally produced on the screen 37.

The light image of increased and amplified brightness produced on the fluorescent screen 42 is then projected on a viewing screen 45 of enlarged area by means of any suitable optical system, here diagrammatically illustrated by a single lens 44.

Thus in the present system the image depicted on a television receiving tube is not only enlarged for greater ease in viewing but also the amount of light available at the screen of the receiving tube is amplified so that the resultant enlarged image is comparable in light intensity to the smaller image of the cathode ray receiving tube itself and both an enlarged and brilliant image is attained.

What is claimed is:

1. A light amplifier for use in a television receiving system wherein the received light image is projected on a viewing screen comprising, an evacuated container, a photo-sensitive layer having said light image impressed thereon whereby an electron image corresponding thereto is produced, a fluorescent screen, means for applying an accelerating potential between said photo-sensitive layer and said fluorescent screen, said photo-sensitive layer and said fluorescent screen being positioned in said evacuated container in immediate proximity to each other so that the electrons emitted by elemental areas of said photo-sensitive layer impinge on corresponding elemental areas of said fluorescent screen under the sole impetus of said accelerating potential and a semi-transparent metallic layer on the face of said fluorescent screen adjacent said photo-sensitive layer.

2. A light amplifier comprising, a cathode ray image tube having a fluorescent screen, a photo-sensitive layer of substantially larger area than said fluorescent screen, means for projecting an enlargement of the image produced on said fluorescent screen on said photo-sensitive layer whereby a corresponding enlarged electron image is produced; a second fluorescent screen of substantially the same area as said photo-sensitive layer positioned closely adjacent thereto, means for applying an accelerating potential between said photo-sensitive layer and said second fluorescent screen and a semi-transparent metallic coating on the face of said second fluorescent screen which is adjacent said photo-sensitive layer.

3. A light amplifier comprising, a cathode ray receiving tube having a fluorescent screen, a photo-sensitive layer in immediate proximity thereto whereby an electron image corresponding to the light image on said fluorescent screen is produced, a second fluorescent screen positioned closely adjacent said photo-sensitive layer, means for applying an accelerating potential between said photo-sensitive layer and said second fluorescent screen, a semi-transparent metallic layer on the face of said second fluorescent screen adjacent said photo-sensitive layer and means for viewing the light image produced on the other face of said second fluorescent screen by the combined action of said electron image and accelerating potential.

IVAN A. GREENWOOD, Jr.
EVERETT B. HALES.

REFERENCES CITED

The following references are of record in the file of this patent:

UNITED STATES PATENTS

| Number | Name | Date |
|---|---|---|
| 2,177,360 | Busse | Oct. 24, 1939 |
| 2,200,749 | Kemp | May 14, 1940 |
| 2,258,294 | Lubszynski et al. | Oct. 7, 1941 |
| 2,270,373 | Kallmann et al. | Jan. 20, 1942 |
| 2,297,478 | Kallmann | Sept. 29, 1942 |